Aug. 3, 1965         J. A. WESTPHAL         3,198,171
ARTIFICIAL HABITAT AND METHOD FOR THE GROWTH AND
STUDY OF DEEP SEA MARINE ORGANISMS
Filed June 30, 1964
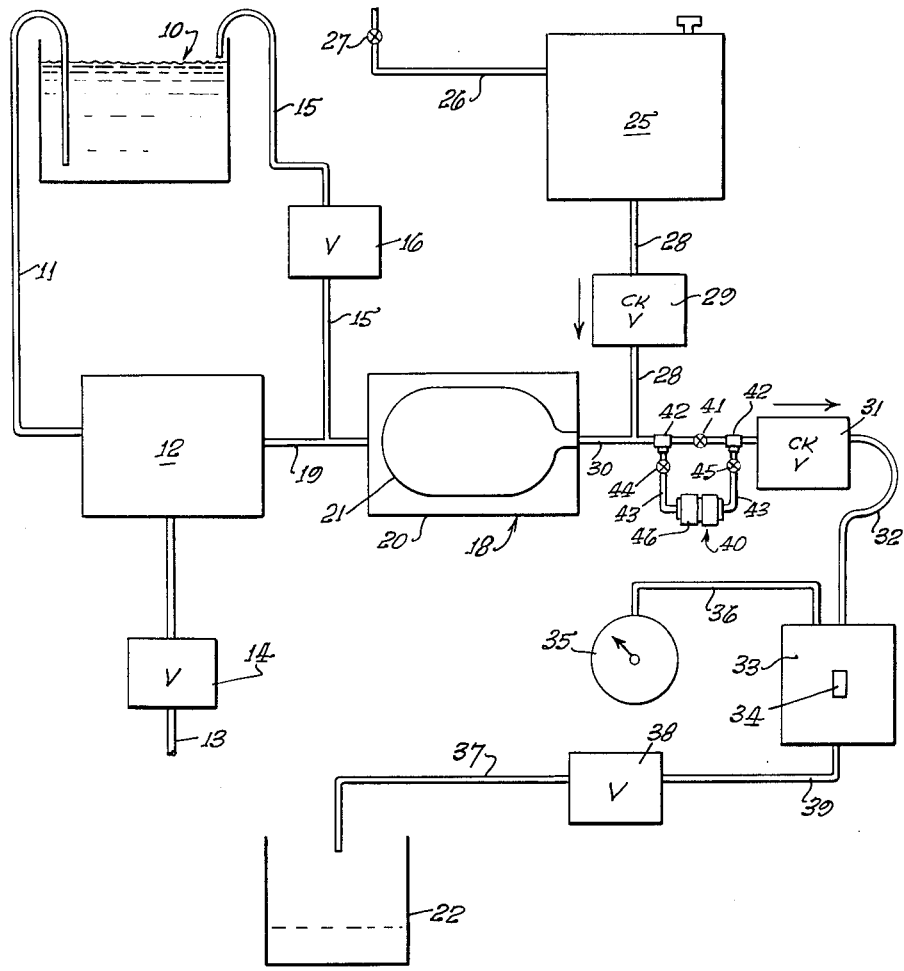
JAMES A. WESTPHAL,
INVENTOR.
BY W Glenn Jones
ATTORNEY.

3,198,171
ARTIFICIAL HABITAT AND METHOD FOR THE GROWTH AND STUDY OF DEEP SEA MARINE ORGANISMS
James A. Westphal, Altadena, Calif., assignor, by mesne assignments, to the United States of America as represented by the Secretary of the Navy
Filed June 30, 1964, Ser. No. 379,415
8 Claims. (Cl. 119—1)

This invention relates to a method and apparatus for environmental control utilized in the study and observation of deep sea biota.

The ecology of deep sea biota differs significantly from that of the biota from shallow polar waters in the one important factor of pressure. While the temperature environments may be similar, it is obvious that deep sea biota originate, grow, and develop under sometimes tremendous pressures. It has been found important to investigate the effects of similar pressures to those found in the deep sea on the bio-chemistry of biological systems. From the paleoecologic point of view, particular interest is being shown in the possible effects of high pressure on the chemistry of skeletal hard parts such as $CaCO_3$ and $SiO_2(OH)$. If a relationship between pressure and the skeletal chemistry should exist, and if the effect of pressure can be distinguished from that related to temperature and changes in the chemistry of the water, this would provide a method of paleoecologic application to determine depths and the changes in depths found in the deep sea.

The object of this invention, therefore, is to provide a means and method for establishing suitable environmental conditions for observing the growth of deep sea marine organisms.

Another object of this invention is to provide a pressurized growing vessel designed to facilitate growth experiments under open flow pressurization.

A further object of this inveniton is to provide a means whereby the deep seat growth environment of the marine organisms under study and observation may be precisely duplicated.

A still further object of this invention is to provide uncontaminated sea water to the pressure exchange and growing vessels for further precise duplication of the necessary environmental conditions.

Another object of this invention is to provide a novel means for the flow control of the sea water passing through the pressurized system.

Other objects, advantages and novel features of the invention will become apparent from the following detailed description of the invention when considered in conjunction with the accompanying drawings wherein:

The figure is a flow diagram illustrating the method and apparatus utilized to produce the proper environment for the growth of deep sea biota.

With reference to the flow diagram, distilled water from a reservoir 10 is drawn into an air driven hydraulic pump 12 through water connection 11. This hydraulic pump 12 is designed to operate at very low flow rates. A pressurized supply of air is delivered to the air end of the pump 12 by means of air lines 13 and air stop valve 14. As the ratio of the area of the air piston to the area of the water piston may be large, say 60:1, the pressure of the distilled water delivered by the pump 12 is regulated by the pressure of the air supply. Thus an inlet air pressure of 50 p.s.i. will yield a water pressure of approximately 3000 p.s.i. The pressurized distilled water is then delivered by the pump 12 to the pressure exchange vessel 18 through the line 19 or it may be diverted through bypass line 15 and stop valve 16 and returned to the reservoir 10.

Pressure exchange vessel 18 comprises an outer shell 20 adapted to withstand the desired high pressures delivered by the pump 12. Enclosed within this shell 20 is a non-permeable flexible bag or diaphragm 21 which is adapted to receive a charge of sea water from sea water reservoir 25. This sea water reservoir 25 is a closed tank adapted to be air pressurized with a low air pressure of say 15 p.s.i. through air line 26 and stop valve 27. The sea water then passes through line 28 and check valve 29 into the non-permeable flexible bag 21 through the line 30. Obviously, this charge of sea water can only be delivered to bag 20 when the pressure of the distilled water in shell 20 is less than the air input pressure into the sea water reservoir 25.

With the bag 21 filled with sea water, as the pressure of the distilled water in shell 20 increases, the sea water is forced through line 30, open stop valve 41, check valve 31 and line 32 into the pressurized growing vessel 33. This latter vessel contains the biota under observation and is provided with a stout window 34 made of Lucite or other suitable plastic capable of withstanding the high pressures utilized. A high pressure gauge 35 is connected to the growing vessel 33 by means of line 36 to enable monitoring of the pressures developed therein.

The discharge of sea water from the growing vessel 33 is accomplished by line 39 leading through a normally open exhaust stop valve 38 and a rate of flow controlling capillary line 37 to an open waste vessel 22. Since the flow through a capillary is proportional to its length and the fourth power of its bore radius, the flow rate may be easily controlled by a predetermined choice of capillary length and bore. In an actual installation, this capillary tubing consists of a chosen length of hypodermic tubing.

In order to maintain a periodic flow of fresh sea water throughout the system, a recycling system is provided based on a stroke counting system actuated by the hydraulic piston rod. This stroke counting system, well known in the prior art, consists of various contact levers, motor driven cams, and electrical switches operated thereby whereby the following cyclical action is obtained: After the pump has moved enough distilled water into the pressure exchange vessel 18 to exhaust the sea water in bag 21, the hydraulic piston trips the first lever contact and the following cycle is initiated:

(1) Sea water exhaust stop valve 38 closes, sealing off the pressurized growing vessel 33 from the rest of the system as sea water flows only toward the growing vessel through the check valve 31.

(2) Air input stop valve 14 closes and bypass stop valve 16 opens. Pump 12 is stopped. The pressurized sea water from reservoir 25 displaces the fresh water out of the pressure exchange vessel 18, refilling the non-permeable flexible bag 21 with fresh sea water and returning the displaced fresh water to the reservoir 10.

(3) Stop valve 16 closes and the air input stop valve 14 opens allowing the pump 12 to repressurize the system. Check valve 29 prevents the sea water from returning to its reservoir 25.

(4) Sea water exhaust stop valve 38 opens allowing the flow of sea water through the pressurized growing vessel 33 to resume.

In connection with the above description of the pressurizing and replenishment cycle, it is to be understood that all of the valves being closed and opened are electrically operated valves. In order, these valves are numbered 38, 14, and 16.

It is further to be noted that one of the significant features of the invention so far disclosed lies in the use of capillary tubing to control the rate of flow of a fluid from a highly pressurized system. As previously indicated, the desired rate of flow may be obtained by utilizing a predetermined length of capillary tubing having a known bore.

In order to provide food for the marine organisms undergoing observation and study in the pressurized growing vessel, a feeding unit 40 may be inserted in the connection line 30 running from the pressure exchange vessel 18 and the check valve 31. This feeding unit consists of a stop valve 41 mounted in line 30 between two T's 42. Lines 43 are then led from these T's through stop valves 44 and 45 into a feeding chamber 46. Stop valve 41 is normally open with stop valves 44 and 45 normally closed. When desired, feed for the marine organisms is introduced into chamber 46. Valve 41 is then closed and valves 44 and 45 opened in turn. This manipulation of the valves 41, 44, and 45 allows the feeding material to be first put under pressure and then passed into the line 30 downstream of valve 41 and thence through check valve 31 into the growing vessel 33. While normally utilized for feeding material, this feeding unit 40 may also be employed to introduce desired chemicals or other materials into the growing vessel.

As a matter of interest, it may be noted that the sea water used in the apparatus described above is obtained in sterile tanks or large bottles either from the open sea well outside the coastal areas or, where important, sea water may be taken from the locality from which the marine organisms have been obtained.

While the invention has been illustrated diagrammatically, it is to be understood that all of the equipment is constructed of materials capable of withstanding the high pressures involved and proper sealing means are provided between the various connection lines or piping and the equipment so interconnected.

While not shown, temperature control of the sea water portion of the system may be effected by installing standard cooling coils fed by a refrigeration system adjacent to either the sea water reservoir 25, pressure exchange vessel 18, or the growing vessel 33. One way of accomplishing this result would be to place either the exchange vessel or the growing vessel in an open fresh water bath with the cooling coils immersed in the fresh water. Thermostatic controls could then be provided to maintain the sea water passing through the growing vessel at a desired temperature, comparable with that temperature found in the locality from which the organisms were secured.

Obviously many modifications and variations of the present invention are possible in the light of the above teachings. It is therefore to be understood that within the scope of the appended claims the invention may be practiced otherwise than as specifically described, including the study of the solubility under deep sea conditions of organic and inorganic ocean bottom materials.

I claim:

1. Apparatus for the control of environmental conditions necessary to the growth study and observation of deep sea marine organisms comprising, in combination:
 a fresh water system means for developing the high pressures needed to simulate the normal pressures under which such marine organisms exist;
 a growing vessel for containing living specimens of said marine organisms;
 a highly pressurized sea water system including means for furnishing pressurized salt water to said growing vessel; and
 means to transfer said high pressures developed in said fresh water system to said sea water system without contamination of said sea water.

2. Apparatus for the control of environmental conditions necessary to the study and observation of deep sea water organisms as claimed in claim 1 further characterized by said fresh water system including an air driven hydraulic pump, a reservoir of fresh water supplying said pump with fresh water, connection means between said pump and said high pressure transfer means, and bypass connection means between said transfer means and said fresh water reservoir, said bypass connection means having a normally closed stop valve inserted therein.

3. Apparatus for the control of environmental conditions necessary to the study and observation of deep sea marine organisms as claimed in claim 1 further characterized by said highly pressurized sea water system including a low pressure air pressurized closed reservoir for said sea water, one way flow connection means from said reservoir to said high pressure transfer means, one way flow connection means from said high pressure transfer means to said growing vessel, a waste vessel for receiving the sea water discharged from said growing vessel, and flow control connection means leading from said growing vessel to said waste vessel.

4. Apparatus for the control of environmental conditions necessary to the study and observation of deep sea marine organisms as claimed in claim 1 further characterized by said means to transfer the high pressures developed in said fresh water system to said sea water system without contamination of said sea water consisting of:
 an outer shell connected to said fresh water system and adapted to withstand the high pressures developed in said fresh water system;
 a non-permeable flexible bag contained within said outer shell, said bag being adapted to receive and discharge said sea water; and
 one way flow connections leading from said non-permeable flexible bag to said growing vessel.

5. Apparatus for the control of environmental conditions necessary to the study and observation of deep sea marine organisms as claimed in claim 3 wherein said flow control connection means includes a portion of capillary tubing having a predetermined length and bore, and a normally open stop valve.

6. Apparatus for the control of environmental conditions necessary to the study and observation of deep sea marine organisms as claimed in claim 3 further characterized by having a feeding unit inserted in said one way flow connection means leading from said high pressure transfer means to said growing vessel, said feeding unit consisting of a feeding chamber adapted to receive food, connection means between said chamber and said one way flow control means, and flow control means inserted in said one way flow connection means and said chamber connection means for controlling the flow of said highly pressurized sea water through said feeding chamber.

7. The method of controlling the environmental conditions necessary to the study and observation of living deep sea marine organisms comprising:
 establishing a high pressure in a fresh water system;
 enclosing specimens of said organisms in a confined space included in a sea water system;
 passing sea water under a controlled rate of flow through said confined space and said sea water system; and
 transferring the high pressure established in said fresh water system to said sea water system without contaminating said sea water.

8. The method of controlling certain environmental conditions necessary to the study of living deep sea biota comprising:
 providing a fresh water system to develop a controllable high pressure;
 providing a sea water system for passing said sea water through a confined space containing specimens of said biota;

transferring the high pressure developed in said fresh water system to said sea water system without contamination of said sea water; and controlling the rate of flow through said sea water system by means of a capillary having a predetermined length and bore.

References Cited by the Examiner

UNITED STATES PATENTS

| | | | |
|---|---|---|---|
| 2,513,455 | 7/50 | Cornelius | 222—386 X |
| 2,621,719 | 12/52 | Eaton et al. | 222—386 X |
| 2,778,534 | 1/57 | Ramsey | 222—129.4 |
| 2,819,679 | 1/58 | Wilson | 103—152 |
| 2,843,050 | 7/58 | Harper | 103—152 |
| 3,148,624 | 9/64 | Baldwin | 103—148 X |

References Cited by the Applicant

UNITED STATES PATENTS

| | | |
|---|---|---|
| 1,747,804 | 2/30 | Travers et al. |
| 2,889,275 | 6/59 | Moore. |
| 3,025,831 | 3/62 | Berardi. |
| 3,076,432 | 2/63 | Jung et al. |
| 3,110,285 | 11/63 | Greenough. |
| 3,116,712 | 1/64 | Ogden et al. |

SAMUEL KOREN, *Primary Examiner.*

ALDRICH F. MEDBERY, *Examiner.*